UNITED STATES PATENT OFFICE.

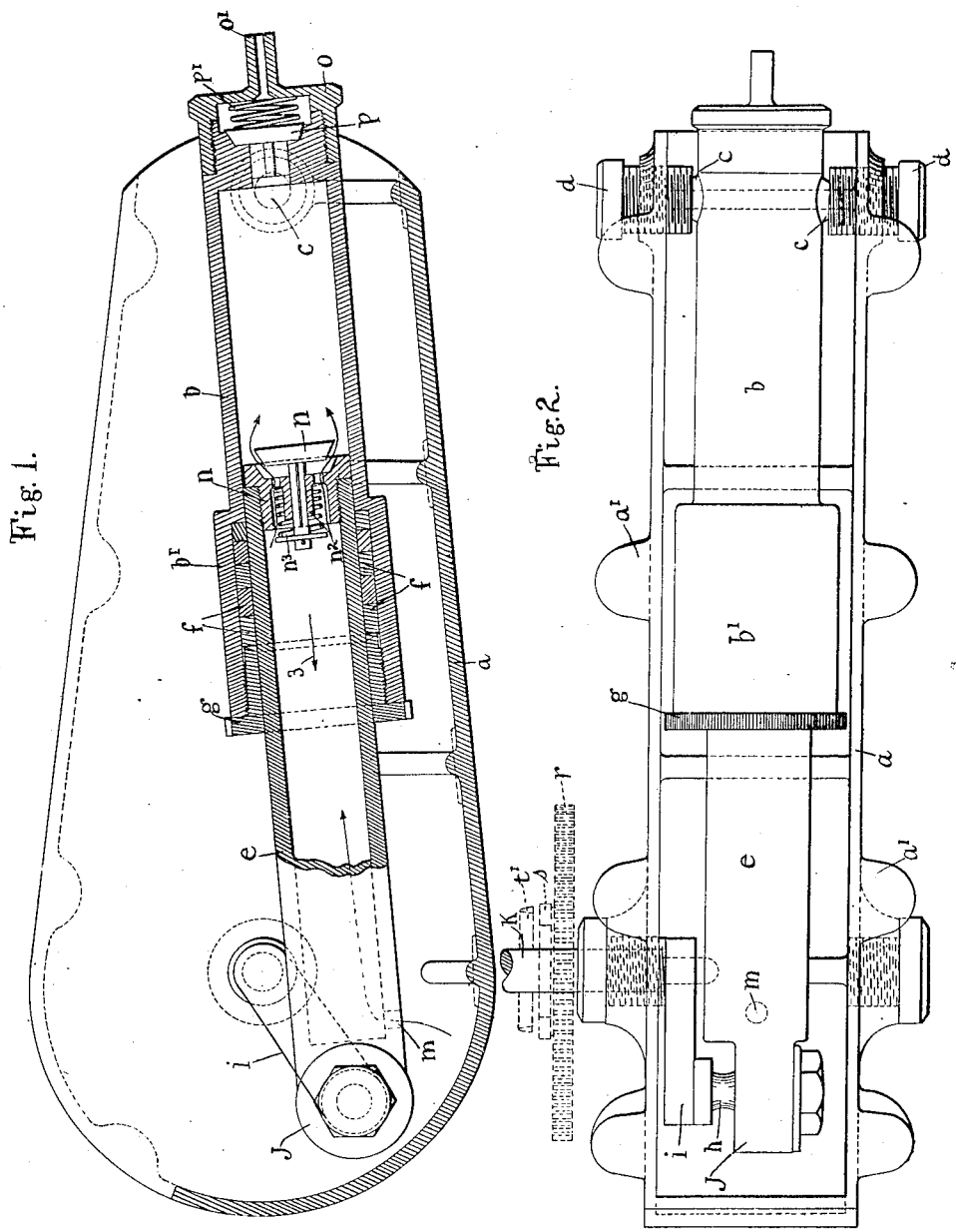

ALBERT J. E. DAFFRIN, OF DIEPPE, FRANCE, ASSIGNOR TO ADDISON L. MELVIN, OF CHICAGO, ILLINOIS.

APPARATUS FOR INFLATING AUTOMOBILE-TIRES.

No. 882,099.  Specification of Letters Patent.  Patented March 17, 1908.

Application filed December 7, 1907. Serial No. 405,566.

*To all whom it may concern:*

Be it known that I, ALBERT J. E. DAFFRIN, citizen of France, residing at Dieppe, France, have invented new and useful Improvements in Apparatus for Inflating Automobile-Tires, of which the following is a specification.

My said invention relates to an improved device or apparatus to be used for inflating the tires of automobiles.

I have aimed, in devising my present invention, to produce, at a minimum cost, an extremely simple and efficient device which could be readily applied to any of the existing types of automobiles, and operated by the engine thereof, whereby the power of the engine could be used to pump up the tires.

I have further aimed to produce a construction which would avoid all danger of oil passing with the air into the interior of the tire with its attendant deteriorating effects thereon, which would be protected from dirt and grease and which would require but little attention.

With these and other objects in view the invention includes the novel features of construction and arrangement of parts hereinafter described and particularly pointed out in the appended claims.

An embodiment of the invention is illustrated in the accompanying drawing in which:

Figure 1 is a sectional elevation and Fig. 2 is a horizontal section.

Referring by reference characters to this drawing $a$, designates a casing, which is preferably formed of aluminium to secure minimum weight with the requisite strength, and which serves to support the pump and its operating parts, and also to inclose and protect the same from dirt and grease. The casing is provided with lugs or projections $a'$ by which it may be bolted or clamped to the automobile frame. Within this casing is located a pump barrel or cylinder $b$ on the opposite sides of which are projections $c$, which are pivotally supported in bushings $d$ threaded through the side walls of the casing near one end. A tubular piston $e$ extends within the opposite open end of the cylinder or barrel $b$, a tight joint being secured between the piston and barrel by packing rings $f$ located in an annular space or rabbet formed by an enlargement $b'$ of the barrel.

A bushing $g$ encircling the piston and threaded into the open end of the enlarged portion of the barrel serves both to permit the insertion and removal of the packing rings and also the compression of the same to secure a sufficiently tight joint.

I have found that by the use of asbestos packing rings I can secure a joint which will remain air tight for long periods of time without the necessity of any lubricating material whatever and especially is this true where the packing rings are made of amiantus, which by its fine silky nature, enables it to make a tight joint between the two relatively moving parts without undue friction or overheating. This, coupled with the fact that the valves hereinafter described, require no lubrication, enables me to provide a pump which is absolutely free from lubricating material inside of the barrel or cylinder and hence all danger of oil being carried from the pump into the interior of the tires is absolutely avoided. The great advantage of such an arrangement will be manifest when the rotting or deteriorating effect of oil upon rubber is borne in mind.

The rear or outer end of the piston or plunger $e$ has a head $j$ which is mounted upon a crank pin $h$ of a crank $i$, carried by a shaft $k$ which shaft is designed to be operated by a gear $r$ which derives its power from the crank shaft or other moving part of the engine by any suitable transmitting gearing. A clutch $s$ is designed to connect this gear to and disconnect it from the shaft $k$ at will, this clutch being operated by any suitable means not necessary to be shown. The plunger or piston has threaded into the end which is located within the cylinder or barrel $b$, a removable bushing $n$ which has a valve seat to receive a check valve $n'$, the stem of which is guided in a tubular part $n^2$ carried by the bushing and which is under the tension of the spring $n^3$. The outer end of the barrel $b$ is provided also with a valve seat which receives the check valve $p$ which is covered by a cap $o$ threaded upon the outer end of the barrel. This cap has a space within which is located a spring $p'$ which tends to constantly seat the valve $t$. The cap is also provided with a projection or nipple $o'$ to which is secured a rubber tubing $o^2$ of a length sufficient to enable it to reach to all of the tires of the automobile.

An opening $m$ is provided in the plunger or piston $e$ to permit air to enter the plunger on its outward stroke or when it is moving in the direction of the arrow 3. During this time the valve $p$ will of course be closed and the valve $n'$ unseated and the air will pass through the valve and in the direction of the arrows 1 until the limit of the outward stroke when the barrel $b$ will be filled. On the inward stroke of the piston the valve $n'$ will be closed and the air forced through the nipple $o'$ and pipe $o^2$ to the tire, the valve $p$ opening automatically to permit its passage.

It will thus be seen that I provide an apparatus by which the large tires of heavy automobiles may be quickly inflated by the operation of the engine and the inflation may be carried on without attention from the chauffeur and while he is engaged in picking up his tools after having made a repair, so that by the time he has assembled his tools and devices the inflation of the tire will have been completed. Further, owing to the extreme simplicity of the apparatus it may be readily attached to any automobile on the market and will require a minimum amount of attention. Further, where attention is necessary for the purpose of cleaning or grinding the valves, or tightening the packing this may be readily accomplished. The valve $p$ is accessible by simply unscrewing the cap $o$ which projects through the open end of the case $b$, while the other parts are accessible by the removal of one of the walls $a^2$ of the frame which is made removable for this purpose.

It will be understood that the valve in the outer end of the pump barrel is not absolutely essential as its action is practically supplemental to the action of the check valve within the valve stem of the tire. In a device of this kind however, which is carried by the automobile in order to reach all of the tires it is necessary to have a hose or tube of considerable length with a comparatively small sized pump cylinder, considerable lost motion would result from the compression of the air within the tube or hose and its expansion on the backward stroke of the plunger. To avoid this I find it desirable to use the check valve at the outer end of the pump barrel.

Having thus described my invention what I claim is:

1. An apparatus for inflating the pneumatic tire of automobiles comprising a suitable casing having means for attachment to the automobile frame, a pump pivotally mounted in said casing, a tubular plunger having a telescoping connection with said barrel, a crank shaft journaled in said casing and having its crank connected with said plunger, suitable check valves for controlling the passage of air, means for operating said crank shaft from the engine of the automobile and means for connecting the pump barrel to the tire to be inflated.

2. An apparatus for inflating the pneumatic tires of automobiles, comprising a suitable casing having means for attachment to an automobile frame, a pump barrel having one end pivotally supported in one end of the casing, a hollow plunger working within the barrel, a crank shaft journaled in the opposite end of the casing and having its crank connected with said plunger, check valves for controlling the flow of air through the plunger and barrel, and means for conveying the air from the barrel to the tire to be inflated.

3. An apparatus for inflating the pneumatic tires of automobiles, comprising a suitable casing having means for attachment to an automobile frame, a pump barrel having one end pivotally supported in one end of the casing, a hollow plunger working within the barrel, asbestos packing rings between the barrel and plunger, a crank shaft journaled in the opposite end of the casing and having its crank connected with said plunger, check valves for controlling the flow of air through the plunger and barrel, and means for conveying the air from the barrel to the tire to be inflated.

4. An apparatus for inflating automobile tires comprising a suitable casing having means for attachment to an automobile frame, said casing having an open end, a pump barrel having one end pivotally mounted in proximity to said open end, a plunger working within the opposite end of the barrel and having an air passage through the same, a check valve in said plunger, an operating shaft journaled in the opposite end of said casing having an operating connection to the plunger, and a nipple carried by the barrel and projecting from the open end of the casing for the attachment of an air hose or pipe.

5. An apparatus for inflating automobile tires comprising a suitable casing having means for attachment to an automobile frame, said casing having an open end, a pump barrel having one end pivotally mounted in proximity to said open end, a plunger working within the opposite end of the barrel and having an air passage through the same, a check valve in said plunger, an operating shaft journaled in the opposite end of said casing having an operating connection to the plunger, a cap carried by the end of the barrel accessible through said open end, a check valve within said cap, and a nipple on the cap for the attachment of an air hose.

In testimony whereof I have signed my name to this specification in the presence of two subscribing witnesses.

ALBERT J. E. DAFFRIN.

Witnesses:
DEAN B. MASON,
ELIZABETH T. RACKEMANN.